(12) United States Patent
Masuda et al.

(10) Patent No.: US 9,252,614 B2
(45) Date of Patent: Feb. 2, 2016

(54) VEHICLE COMPRISING BATTERY

(75) Inventors: Tomokazu Masuda, Kasugai (JP);
Yusuke Tsutsui, Anpachi-gun (JP);
Shogo Hirata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/580,246

(22) PCT Filed: Dec. 22, 2011

(86) PCT No.: PCT/JP2011/079881
§ 371 (c)(1),
(2), (4) Date: Sep. 6, 2012

(87) PCT Pub. No.: WO2013/094063
PCT Pub. Date: Jun. 27, 2013

(65) Prior Publication Data
US 2014/0292253 A1  Oct. 2, 2014

(51) Int. Cl.
*H02J 7/00* (2006.01)
*B60Q 3/06* (2006.01)
*B60L 11/18* (2006.01)

(52) U.S. Cl.
CPC ............ *H02J 7/0047* (2013.01); *B60L 11/1818* (2013.01); *B60Q 3/06* (2013.01); *B60Y 2400/92* (2013.01); *Y02T 10/7005* (2013.01); *Y02T 90/14* (2013.01)

(58) Field of Classification Search
CPC ..................................................... H02J 7/0047
USPC .......................................................... 320/107
See application file for complete search history.

(56) References Cited

U.S. PATENT DOCUMENTS

2009/0057041 A1   3/2009  Kamaga
2009/0139781 A1*  6/2009  Straubel ................. 180/65.1

FOREIGN PATENT DOCUMENTS

| JP | A-08-080783    | 3/1996  |
|----|----------------|---------|
| JP | A-2004-196028  | 7/2004  |
| JP | A-2008-210621  | 9/2008  |
| JP | A-2008-279938  | 11/2008 |
| JP | A-2009-065728  | 3/2009  |
| JP | A-2011-087350  | 4/2011  |
| JP | A-2011-131772  | 7/2011  |
| JP | 2011-148390 A  | 8/2011  |
| WO | WO 2012/140729 A1 | 10/2012 |

OTHER PUBLICATIONS

Mar. 27, 2012 International Search Report issued in International Patent Application No. PCT/JP2011/079881 (with translation).

\* cited by examiner

*Primary Examiner* — Thuan Do
(74) *Attorney, Agent, or Firm* — Oliff PLC

(57) ABSTRACT

A vehicle including a battery, a plug receiving portion for receiving a plug for supply an electric power to be charged in the battery or a plug for receiving an electric power discharged from the battery, a lid for closing the plug receiving portion and a light for illuminating the plug receiving portion. In the vehicle, when the state of the vehicle becomes a running mode indicating a state that the running of the vehicle is permitted, the light is turned off.

15 Claims, 4 Drawing Sheets

Fig.4

| OPERATION | TRANSISTOR SW | LID SW | LIGHT |
|---|---|---|---|
| LID CLOSED | ON | OFF | LIGHTED DOWN |
| LID OPENED | ON | ON | LIGHTED ON |
| PLUG INSERTED | OFF | ON | LIGHTED DOWN |
| PLUG EXTRACTED | ON | ON | LIGHTED ON |
| LID CLOSED | ON | OFF | LIGHTED DOWN |
| RUNNING MODE (READY-ON) | OFF | ON/OFF | LIGHTED DOWN |

VEHICLE COMPRISING BATTERY

TECHNICAL FIELD

This invention relates to a vehicle comprising a battery.

BACKGROUND ART

In the Patent Document 1, a vehicle comprising a battery, a plug receiving portion for receiving a plug for supplying an electric power to be charged in this battery, a lid for closing this plug receiving portion and a light for illuminating the plug receiving portion is described. In this regard, in this vehicle, when the lid is opened and the plug is not received in the plug receiving portion, the light is turned on and when the lid is opened and the plug is received in the plug receiving portion, the light is turned off. That is, in the vehicle described in the Patent Document 1, in order that a person who intends to make the plug received in the plug receiving portion can easily see the plug receiving portion, when the plug is being received in the plug (i.e. when the lid is opened and the plug is not received in the plug receiving portion), the light is turned on and when the plug has been already received in the plug receiving portion or when there is no possibility that the plug intends to be received in the plug receiving portion (i.e. when the lid is closed), the light is turned off. Thereby, the consumption of the electric power of the battery for lighting up the light is decreased as possible.

CITATION LIST

Patent Document 1: Unexamined Patent Publication No. 2011-87350
Patent Document 2: Unexamined Patent Publication No. 2008-279938

SUMMARY OF INVENTION

1. Technical Problem

In the vehicle described in the Patent Document 1, for example, the vehicle is running and therefore, even when there is extremely low possibility that the plug intends to be received in the plug receiving portion, if the lid is opened, the light is lighted up. Such a lighting up of the light is not preferred in terms of the decrease of the consumption of the electric power of the battery for lighting up the light as possible.

The object of this invention is to decrease the consumption of the electric power of the battery for the lighting up the light compared with the conventional consumption.

2. Solution to Problem

The invention of this application relates to a vehicle comprising a battery, a plug receiving portion for receiving a plug for supplying an electric power to be charged in the battery or for receiving an electric power discharged from the battery, a lid for closing the plug receiving portion and a light for illuminating the plug receiving portion. Then, in this invention, when the state of the vehicle becomes a running mode indicating a state that the running of the vehicle is permitted, the light is turned off.

According to this invention, the following effect can be obtained. That is, when the state of the vehicle becomes the running mode, it can be said that there is an extremely low possibility that the plug is received in the plug receiving portion. Therefore, at this time, there is a less need for lighting up the light. In this regard, in this invention, when the state of the vehicle becomes the running mode, the light is turned off. Thus, according to this invention, the effect that the consumption of the electric power of the battery for lighting up the light is decreased as possible can be obtained.

Further, in an invention of this application, in the above-mentioned invention, when the state of the vehicle becomes the running mode, the light is turned off by making an electronic switch off.

In this invention, the light is turned off by making the electronic switch off and therefore, according to this invention, the effect that the turning on and off of the light can be simply controlled can be obtained.

Further, in an invention of this application, in the case that the vehicle of the above-mentioned invention further comprises a lid switch which is switched between the on and off states depending on the open and close of the lid, the lid switch is electrically connected in series to the electronic switch such that when the lid switch and the electronic switch are on, the light is turned on and when the lid switch or the electronic switch are off, the light is turned off.

Further, in an invention of this application, in the above-mentioned invention, the electronic switch is a transistor switch.

Further, in an invention of this application, in the above-mentioned invention, when the state of the vehicle becomes the running mode and the lid is opened, a warning for noticing that the lid is opened is activated.

According to this invention, the effect that when there is an extremely high possibility that the vehicle is running (i.e. when the state of the vehicle becomes the running mode), for example, a user of the vehicle can surely know that the lid to be closed during the running of the vehicle is opened can be obtained.

BRIEF DESCRIPTION OF DRAWINGS

FIG. 4 is a view showing a relationship between the turning on and off of the light and the state of the constitution elements relating thereto in the case that the electronic circuit shown in FIG. 3 is employed.

DESCRIPTION OF EMBODIMENTS

Figure 1:
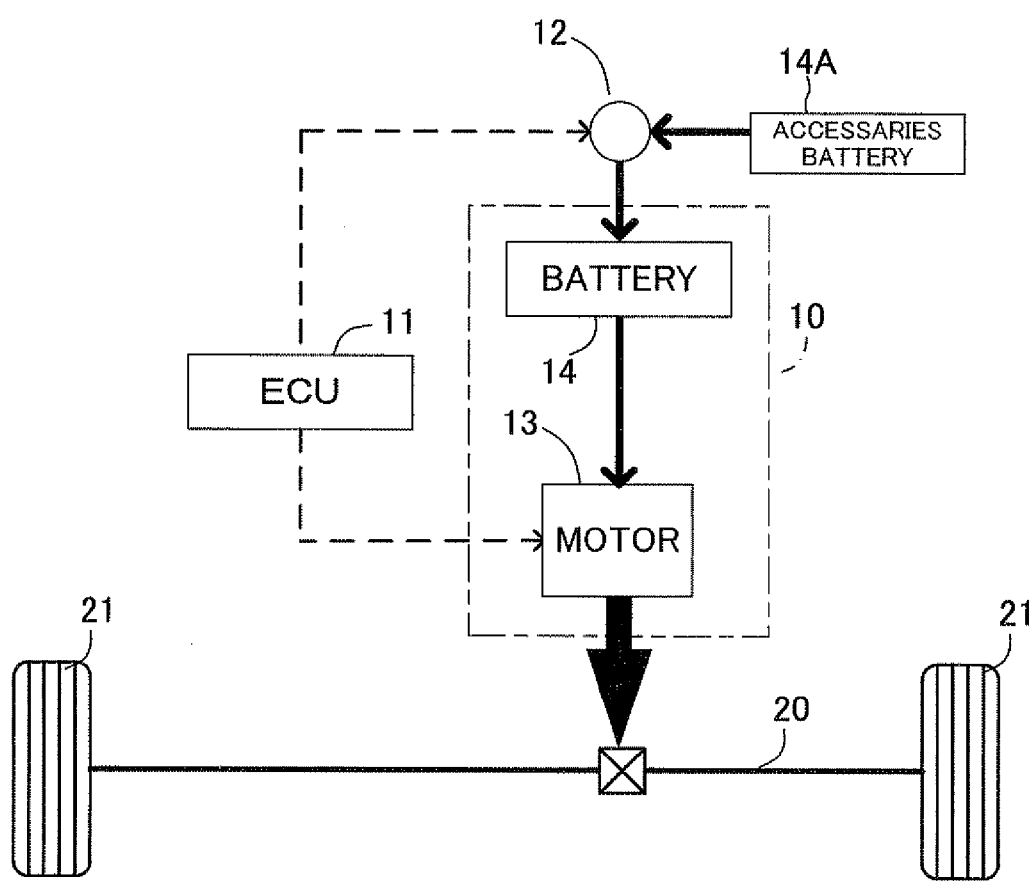
FIG. 1 is a view showing a vehicle of a first embodiment.

Below, embodiments of a vehicle of this invention will be explained. An example of the vehicle of this application (hereinafter, this embodiment will be referred to as—first embodiment—) is shown in FIG. 1. The vehicle shown in FIG. 1 comprises a driving portion 10, an electronic control unit (ECU) 11, a charging portion 12, a driving shaft 20 and driving wheels 21. The driving portion 10 has at least an electric motor 13 and a battery 14. The motor 13 is driven by an electric power charged in the battery 14. The power output from the motor 13 when the motor 13 is driven is transmitted to the driving wheels 21 via the driving shaft 20. When the power output from the motor 13 is transmitted to the driving wheels 21, the vehicle runs. It should be noted that the operation of the motor 13 is controlled by the electronic control unit 11. The battery 14 is charged by an electric power supplied via a charging portion 12.

Figure 2:
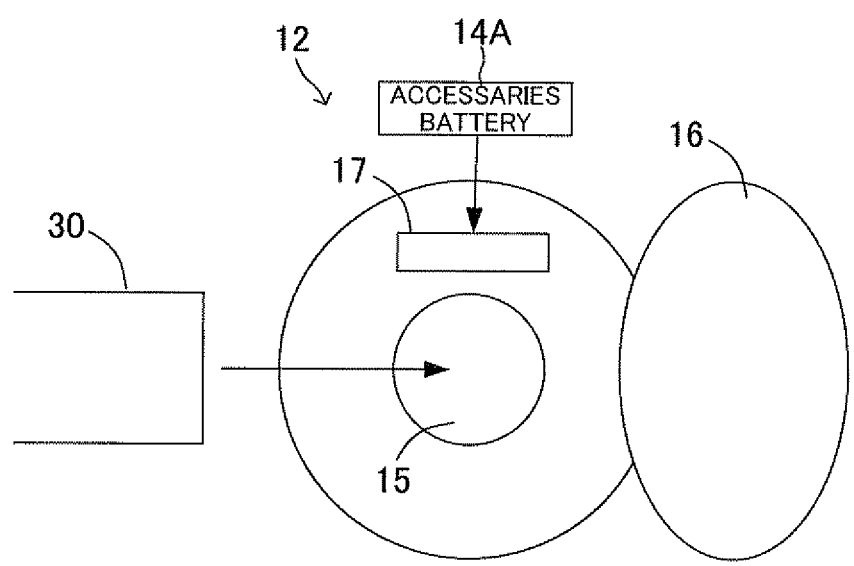
FIG. 2 is a view showing a plug receiving portion shown in FIG. 1.

As shown in FIG. 2, the charging portion 12 has a plug receiving portion 15, a lid 16 and a light 17. The plug receiving portion 15 can receive a plug 30 for supplying an electric power to be charged in the battery 14. The lid 16 can be opened and closed and when the lid 16 is opened, the plug receiving portion 15 can be accessed and when the lid 16 is closed, the plug receiving portion 15 cannot be accessed. Therefore, when the lid 16 is opened, the plug 30 can be received in the plug receiving portion 15 and can be removed from the plug receiving portion 15. The light 17 is positioned around the plug receiving portion 15 and illuminates the plug receiving portion 15 and the surroundings thereof. It should be noted that the light 17 is turned on by the electric power of an accessories battery 14A other than the battery 14.

Next, a running mode of the first embodiment will be explained. In the first embodiment, only when the state of the vehicle has become a running mode, the vehicle is permitted to run. In this regard, the running mode is one indicating a state that the running of the vehicle is permitted. For example, when a so-called shift lever of the vehicle is located at a parking position used for maintaining the vehicle stopped, the state of the vehicle has not become the running mode and when the shift lever is located at a position other than the parking position, the state of the vehicle has become the running mode.

Next, a control of the light according to the first embodiment will be explained. In the first embodiment, when the lid 16 is closed, the light 17 is turned off independently of whether the state of the vehicle has become the running mode. Further, when the lid 16 is opened and the vehicle is not under the running mode, the light 17 is turned on. On the other hand, when the lid 16 is opened and the vehicle is under the running mode, the light 17 is turned off.

According to the first embodiment, the following effects can be obtained. That is, when the state of the vehicle becomes the running mode, it can be said that there is an extremely low possible that the plug is received in the plug receiving portion. Therefore, at this time, there is a less need for turning on the light. In this regard, in the first embodiment, when the state of the vehicle becomes the running mode, the light is turned off. Thus, according to the first embodiment, the effect that the consumption of the electric power for lighting up the light is decreased can be obtained.

Next, a second embodiment will be explained. It should be noted that the constitution and the control according to the second embodiment not explained below are the same as those of the first embodiment, respectively or those obviously introduced from the constitution and the control of the first embodiment in view of the constitution and the control of the second embodiment explained below.

In the second embodiment, when the lid 16 is closed, the light 17 is turned off independently of whether the vehicle is under the running mode. Further, when the lid 16 is opened, the vehicle has not been under the running mode and plug has not been received, the light 17 is lighted up and on the other hand, when the lid 16 is opened, the vehicle has not been under the running mode and the plug has been received in the plug receiving portion, the light 17 is lighted down. On the other hand, when the lid 16 has been opened and the state of the vehicle has become the running mode, the light 17 has been lighted down independently of whether the plug has been received in the plug receiving portion.

Figure 3:
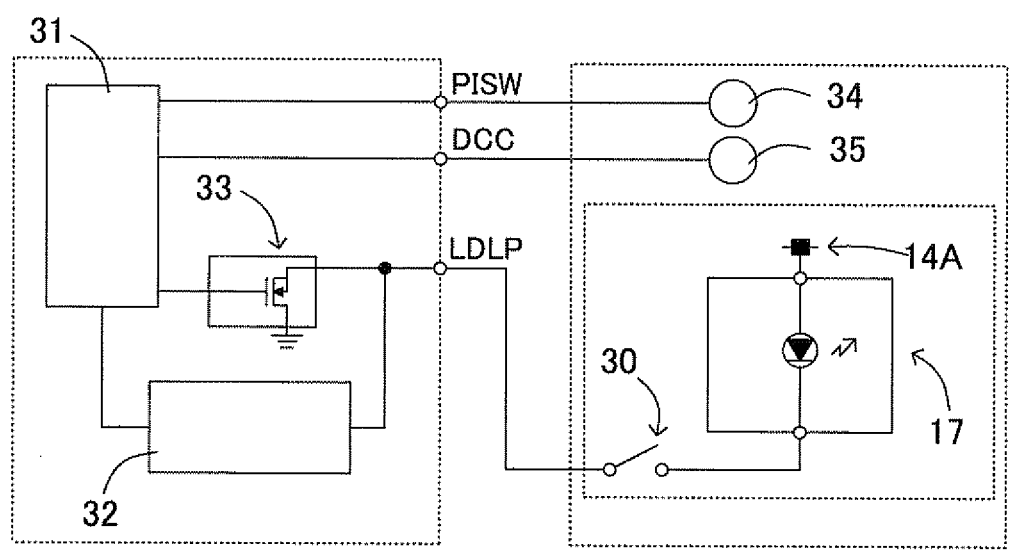
FIG. 3 is a view showing an example of an electronic circuit for controlling the turning on and off of the light of the vehicle shown in FIG. 1.

Next, an example of a circuit which may be employed as an electric circuit for controlling the light in the above-explained embodiments will be explained. The example of this circuit is shown in FIG. 3. In FIG. 3, 14A denotes the accessories battery also shown in FIG. 1, 17 denotes the light also shown in FIG. 2, 30 denotes a lid switch, 31 denotes a microcomputer of the electronic control unit shown in FIG. 1, 32 denotes a monitor circuit, 33 denotes a switch constituted by a transistor (hereinafter, this switch will be referred to as—transistor switch—), 34 denotes an AC plug receiving portion and 35 denotes a DC plug receiving portion.

The plug 30 for supplying an alternating-current electric power can be connected to the AC plug receiving portion 34 and the plug 30 for supplying a direct-current electric power can be connected to the DC plug receiving portion 35. That is, the AC and DC plug receiving portions 34 and 35 correspond to the plug receiving portion of the above-explained embodiments. Further, the AC and DC plug receiving portions 34 and 35 are connected to the microcomputer 31. The microcomputer 31 receives a signal PISW output when the plug 30 is connected to the AC plug receiving portion 34 and thereby, recognizes that the plug 40 is connected to the AC plug receiving portion 34. Further, the microcomputer 31 receives a signal DCC output when the plug 30 is connected to the DC plug receiving portion 35 and thereby, recognizes that the plug 30 is connected to the DC plug receiving portion 35.

The light 17 is connected to the accessories battery 14A at its one end and is connected to the lid switch 30 at its other end. The lid switch 30 is connected to the light 17 at its end and is connected to the transistor switch 33 at its other end. The transistor switch 33 is connected to the lid switch 30 at its one end and is connected to the microcomputer 31 at its other end. Therefore, the light 17 is connected to the microcomputer 31 via the lid and transistor switches 30 and 33 which are electrically connected in series to each other. The lid switch 30 is closed when the lid 16 is opened (i.e. the lid switch is on) and is opened when the lid 16 is closed (i.e. the lid switch is off). The state of the transistor switch 33 is controlled by the microcomputer 31 (i.e. the transistor switch is on and off).

The monitor 32 is connected to the microcomputer 31 and monitors/detects the state of the lid switch 30 and supplies information regarding to the state of the lid switch 30.

The light 17 is lighted up when the lid and transistor switches 30 and 33 are under the ON state and the light 17 is lighted down when the lid and transistor switches 30 and 33 are under the OFF state. That is, the lid and transistor switches 30 and 33 are electrically connected in series to each other such that the light is lighted up when the lid and transistor switches are under the ON state and the light is lighted down when the lid switches or the transistor switch is under the OFF state.

Next, a control of the light according to the first embodiment in the case that the circuit shown in FIG. 3 is employed will be explained. In this case, the transistor switch 33 is under the OFF state when the vehicle is under the running state and the transistor switch 3 is under the ON state when the vehicle is not under the running state.

Then, when the lid 16 is closed, the lid switch 30 is under the OFF state and therefore, the light 17 is lighted down independently of the state of the transistor switch 33. Further, when the lid 16 is opened and the vehicle is not under the running mode, the lid and transistor switches 30 and 33 are under the ON state and therefore, the light 17 is lighted up. On the other hand, when the lid 16 is opened and the vehicle is under the running mode, the lid switch 30 is under the ON state but the transistor switch 33 is under the OFF state and therefore, the light 17 is lighted down.

Next, a control of the light according to the second embodiment in the case that the circuit shown in FIG. 3 is employed will be explained. In this case, the transistor switch 33 becomes the OFF state when the vehicle is under the running state or when the plug 30 is connected to the AC or DC plug receiving portion 34 or 35 while the transistor switch 33 becomes the ON state when the vehicle is not under the running mode and the plug 30 is not connected to the AC and DC plug receiving portions 34 and 35.

Then, when the lid 16 is closed, the lid switch 30 is under the OFF state and therefore, the light 17 is lighted down independently of the state of the transistor switch 33. Further, when the lid 16 is opened, the vehicle is not under the running state and the plug 30 is not connected to the AC and DC plug receiving portions 34 and 35, the lid and transistor switches 30 and 33 are under the ON state and therefore, the light 17 is lighted up. Further, when the lid 16 is opened and the vehicle is under the running mode, the lid switch 30 is under the ON state but the transistor switch 33 is under the OFF state and therefore, the light 17 is lighted down independently of whether the plug 30 is connected to the AC or DC plug receiving portion 34 or 35. Further, the lid 16 is opened and the plug 30 is connected to the AC or DC plug receiving portion 34 or 35, the lid switch 30 is under the ON state but the transistor switch 33 is under the OFF state and therefore, the light 17 is lighted down independently of whether the vehicle is under the running mode.

According to the above-explained control of the light, the states of the transistor and lid switches and the light every operation by the user of the vehicle are those shown in FIG. 4. That is, when the lid is closed, the transistor switch (indicated as—TRANSISTOR SW—in FIG. 4) is under the ON state and the lid switch (indicated as—LID SW—in FIG. 4) is under the OFF state. Thus, the light is lighted down.

Then, when the lid is opened in order to insert the plug into the plug receiving portion (i.e. in order to make the plug received in the plug receiving portion), the state of the transistor switch is maintained the ON state and the state of the lid switch changes to the ON state. Thereby, the light is lighted up. Then, when the plug is inserted into the plug receiving portion, the state of the transistor switch changes to the OFF state and the state of the lid switch changes to the ON state. Thereby, the light is lighted down. As explained above, during the charge of the battery, the light is lighted down.

Then, when the plug is extracted (i.e. is removed) from the plug receiving portion, the state of the transistor switch changes to the ON state and the state of the lid switch is maintained the ON state. Thereby, the light is lighted up. Then, when the lid is closed, the state of the transistor switch is maintained the ON state and the state of the lid switch changes to the OFF state. Thereby, the light is lighted down.

Thereafter, when the state of the vehicle becomes the running mode (READY-ON), the state of the transistor switch changes to the OFF state and the state of the lid switch is maintained the OFF state. It should be noted that at this time, if the lid is opened, the lid switch is under the ON state.

In the case that the circuit shown in FIG. 3 is employed, the light is lighted down by make the circuit element such as the transistor switch the OFF state and therefore, the effect that the lighting up and down can be simply controlled can be obtained.

It should be noted that in the above-explained embodiments, in the case that when the lid is opened, the state of the vehicle becomes the running state and therefore, the light is lighted off, it may be alarmed that the lid is opened. Thereby, for example, the effect that the user of the vehicle can surely recognize that the lid to be closed during the running of the vehicle is opened when there is an extremely high possibility that the vehicle runs (i.e. when the state of the vehicle becomes the running state) can be obtained.

It should be noted that the alarm in this case may inform at least the user of the vehicle that the lid is opened and for example, the alarm may be a visual alarm (for example, the lighting up of an alarm lamp, etc.) or an auditory alarm (for example, the activation of an alarm buzzer, etc.).

Further, in the above-explained embodiments, the transistor switch is employed as a switch for controlling the lighting up and down of the light, however, this invention can broadly apply to the case that an electronic switch is employed.

It should be noted that the above-explained embodiments are those in which this invention is applied to the plug receiving portion used for charging the electric power to the battery, however, this invention can apply to a plug receiving portion used for discharging the electric power from the battery.

Further, the above-explained embodiments are those obtained by applying this invention to the vehicle running only by the power of the electric motor, however, this invention can be applied to a so-called hybrid vehicle running by the power of the electric motor and the power of the internal combustion engine. Further, the above-explained embodiments are those obtained by applying this invention to the vehicle comprising the battery for storing the electric power for driving the electric motor, however, this invention can be broadly applied to a vehicle simply comprising a battery.

The invention claimed is:

1. A vehicle comprising:
   a battery;
   a plug receiving portion configured to receive a plug for supplying an electric power to be charged in the battery or a plug for receiving an electric power discharged from the battery;
   a lid configured to the plug receiving portion;
   a light configured to illuminate the plug receiving portion; and
   an electronic control unit configured to control operation of the light,
   wherein the electronic control unit is configured to turn off the light when a state of the vehicle becomes a running mode, the running mode being a state in which running of the vehicle is permitted.

2. The vehicle as set forth in claim 1, further comprising an electronic switch,
   wherein the electronic control unit is configured to switch the electronic switch to an off state to turn off the light when the state of the vehicle becomes the running mode.

3. The vehicle as set forth in claim 2, further comprising a lid switch which is switched between on and off states depending on whether the lid is open or closed, the lid switch being electrically connected in series to the electronic switch,
   wherein when the lid switch and the electronic switch are on, the light is turned on and when the lid switch or the electronic switch is off, the light is turned off.

4. The vehicle as set forth in claim 3, wherein the electronic switch is a transistor switch.

5. The vehicle as set forth in claim 4, further comprising an alarm configured to indicate that the lid is open,
   wherein the electronic control unit is configured to activate the alarm when the state of the vehicle becomes the running mode and the lid is open.

6. The vehicle as set forth in claim 3, further comprising an alarm configured to indicate that the lid is open,
   wherein the electronic control unit is configured to activate the alarm when the state of the vehicle becomes the running mode and the lid is open.

7. The vehicle as set forth in claim 2, wherein the electronic switch is a transistor switch.

8. The vehicle as set forth in claim 7, further comprising an alarm configured to indicate that the lid is open,
wherein the electronic control unit is configured to activate the alarm when the state of the vehicle becomes the running mode and the lid is open.

9. The vehicle as set forth in claim 2, further comprising an alarm configured to indicate that the lid is open,
wherein the electronic control unit is configured to activate the alarm when the state of the vehicle becomes the running mode and the lid is open.

10. The vehicle as set forth in claim 1, further comprising an alarm configured to indicate that the lid is open,
wherein the electronic control unit is configured to activate the alarm when the state of the vehicle becomes the running mode and the lid is open.

11. The vehicle as set forth in claim 1, wherein the electronic control unit is configured to turn off the light when the state of the vehicle becomes the running mode even when the lid is in an open state such that the plug receiving portion can be accessed.

12. The vehicle as set forth in claim 1, wherein the running mode is a READY-ON state of the vehicle.

13. The vehicle as set forth in claim 12, wherein the electronic control unit is configured to turn off the light when the state of the vehicle becomes the running mode even when the lid is in an open state such that the plug receiving portion can be accessed.

14. The vehicle as set forth in claim 1, wherein the running mode is a state in which a shift lever of the vehicle is in a position other than a parking position.

15. The vehicle as set forth in claim 14, wherein the electronic control unit is configured to turn off the light when the state of the vehicle becomes the running mode even when the lid is in an open state such that the plug receiving portion can be accessed.

* * * * *